P. E. LITTLE.
FIRELESS COOKER.
APPLICATION FILED FEB. 4, 1909.

923,866.

Patented June 8, 1909.

UNITED STATES PATENT OFFICE.

PETER E. LITTLE, OF DAYTON, OHIO.

FIRELESS COOKER.

No. 923,866.　　　Specification of Letters Patent.　　　Patented June 8, 1909.

Application filed February 4, 1909. Serial No. 475,956.

*To all whom it may concern:*

Be it known that I, PETER E. LITTLE, a citizen of the United States, residing at Dayton, in the county of Montgomery and State of Ohio, have invented certain new and useful Improvements in Fireless Cookers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in cooking utensils, and more particularly to improvements in a cover which is designed to prevent the heat from escaping from the pocket or compartment in which the cooking vessel is placed after being subjected to a certain amount of heat by being placed upon a stove or range. The cover also prevents colder air from entering said pocket or compartment.

The apparatus in which the cover is used is termed a "fireless cooker" in common parlance. It consists of a chest with one or more compartments or pockets therein properly insulated so as to exclude air and retain heat. The cooking vessel or vessels containing the article to be cooked are first placed upon a stove or range until the boiling point is reached or approximately so; said vessel or utensil is then removed from the stove and is placed in one of said compartment or compartments where the heat is retained to complete the cooking. By thus prolonging the cooking operation after the vessel is removed from proximity to the fire, much of the flavor is retained and the article so cooked is rendered more palatable and otherwise desirable.

Preceding a detailed description of the invention, reference is made to the accompanying drawings, of which—

Figure 1:
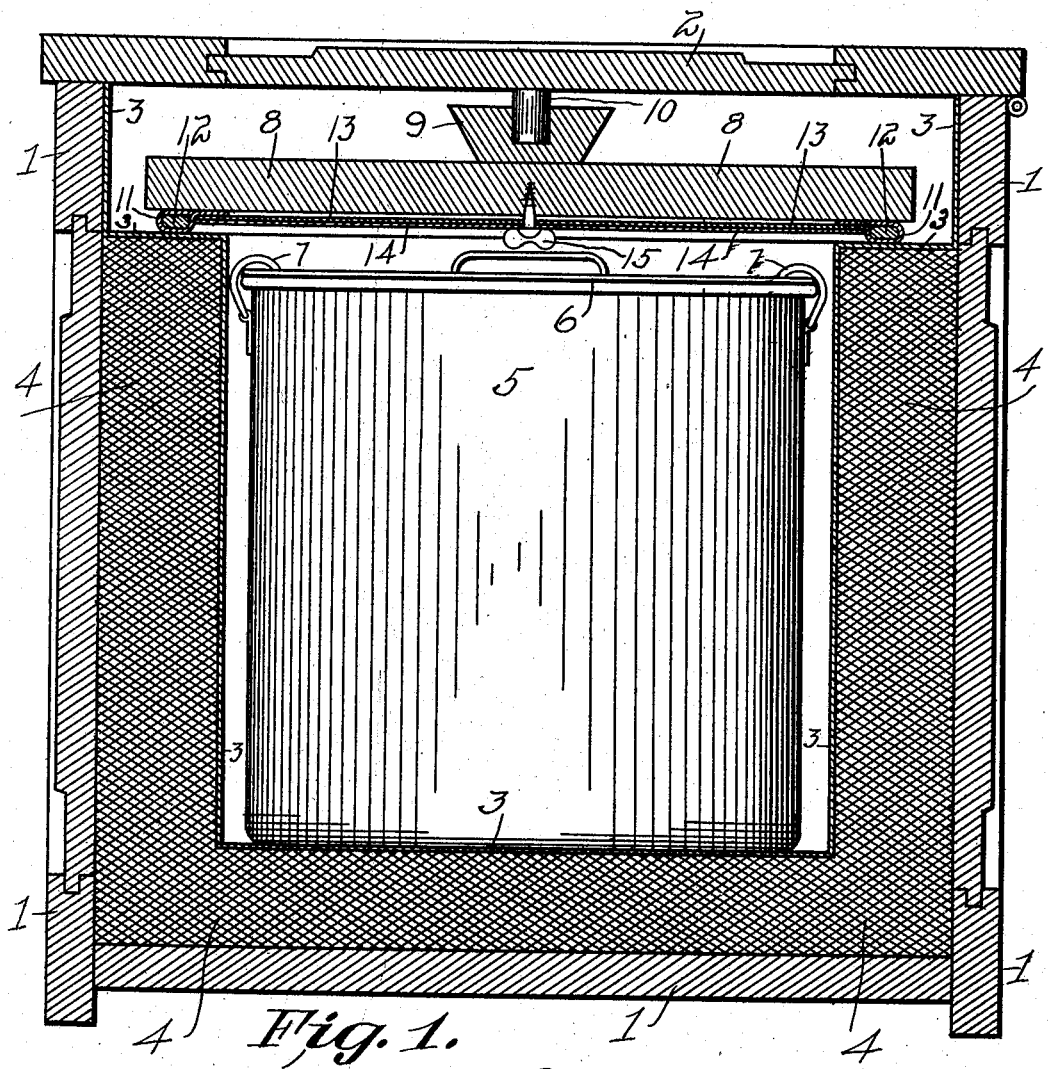
Figure 2:
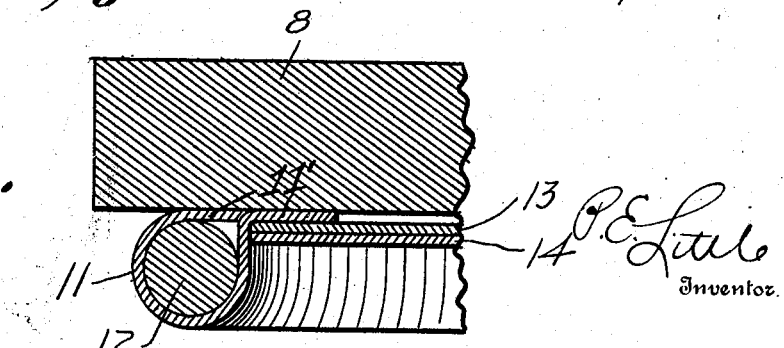

Figure 1, is a vertical sectional elevation through one of the pockets or compartments of a fireless cooker having a cooking utensil therein and my improved cover inclosing said pocket or compartment. Fig. 2, is an enlarged section of a portion of said cover adjacent to the edge.

In a detail description of the invention, similar reference characters indicate corresponding parts.

For the purpose of describing my invention, I have illustrated one pocket or compartment which is preferably of circular form and is inclosed by a metallic lining 3. Arranged on the outside of this metallic lining and completely inclosing it, is a wall 4 of substantial thickness and consisting of any suitable insulating material which is calculated to confine the heat within the pocket, such material for example, as asbestos, mineral wool, etc. Inclosing this wall of insulation are the walls 1 of the chest or casing which is preferably constructed of wood, the parts of which are suitably united to form a substantial chest. A cover 2 also of wood forms the outer closure of the chest.

It will be observed that the metallic lining 3 extends out of the pocket or compartment laterally, and upwardly against the upper portion of the chest terminating immediately below the cover 2. The laterally-extended portion of the metallic-lining incloses the upper surface or edge of the insulation 4 and provides a flat smooth surface which has an important arrangement with the interior cover which will now be described.

The interior cover 8 is constructed of wood and is of circular form, across the upper side thereof and extending from one edge to the other, is a handle portion 9 in the middle of which is inserted a rubber tip 10 to be again referred to. On the inner side of the cover 8 and extending around near the circumference thereof, is a resilient bead 12 constructed of flexible material, preferably cotton rope, and inclosed by a sheathing 11 of textile fabric preferably cotton. The two elements, to-wit: the bead 12 and its covering 11, combine to form a substantial packing, which, when the cover is in position, seals the pocket or compartment. The casing 11 is united to the cover 8 by extending portions 11' thereof parallel with the plane of the cover and uniting them in any suitable manner at such points. Inclosing the space within this packing ring and fitting snugly against the inner side thereof, is an asbestos disk 13. Lying against the outer side of this asbestos disk 13 is a metallic disk 14 of substantially the same diameter and size, and both of which disks are detachably secured to the inner side of the cover 8 by means of a winged screw 15. The metallic disk 14 preserves the asbestos disk from the disintegrating effects of any moisture arising from the vessel or utensil within the pocket or compartment. Furthermore, by means of this detachable connection, the metallic disk 14 may be removed from the cover for the purposes of cleansing without subjecting the packing or sealing ring to water or the like.

5 designates a form of cooking utensil within the pocket or compartment and having a lid 6 which is held on the top of said utensil by suitable fastening devices 7. The weight of the wood cover 2 engaging the rubber tip 10 exerts a suitable pressure upon the lid 8 to compress the packing ring or bead 11 or 12 against the flat surface provided by the laterally extended portions of the metallic lining 3, and thus effectually seal the pocket or compartment from any escape of the heat therein caused by the heated utensil, and from any admission of air to the pocket. It will be understood the utensil or vessel 5 with its contents is removed from the stove or range after brought to the boiling or baking point, and is placed in the pocket or compartment; the cover 8 is then placed above the pocket and the outer cover 2 is closed. The heat within the utensil is thus caused to practically maintain a given temperature until the contents have been thoroughly cooked. The natural flavor of the article is thus preserved while the possibility of scorching or burning the contents or reducing the liquid to an improper condition is avoided. It will be understood that the casing or chest may be of any suitable length to provide as many of the pockets or compartments as may be necessary, and other details of construction may be varied without departing from the spirit of the invention which consists in the construction and advantages of and due to the cover 8 as hereinbefore set forth.

I claim:

1. In a fireless cooker, a casing providing a pocket or compartment in which to place the heated utensil, the space within said casing above said pocket being increased in diameter to provide a horizontal ledge or shoulder at the upper terminal of said pocket, a cover having a sealing bead on its lower side adjacent to its circumference, said bead consisting of resilient material inclosed within a fabric secured to the under side of the cover, an asbestos disk inclosed by said sealing bead, a metallic disk inclosed by said sealing bead and lying against the asbestos disk, said asbestos and metallic disks being detachably united to the cover, and a compressible tip extended from the upper side of said cover, said tip being engaged by the cover of the casing when the latter is closed and whereby the sealing bead is tightly pressed against the horizontal ledge or shoulder surrounding the upper end of the pocket or compartment.

2. In a fireless cooker, a main casing having a cover and providing a pocket or compartment, the space within said casing above said compartment or pocket being of greater diameter than said compartment or pocket, a heat-insulating material in which said pocket or compartment is provided, a metallic lining for said pocket or compartment, said metallic lining extending laterally in the form of a leg or shoulder at the upper terminal of the pocket or compartment and providing a flat annular surface surrounding the mouth of the pocket or compartment, a cover having a sealing bead of an elastic nature secured to its inner side and adapted to engage the flat annular surface surrounding the mouth of the pocket or compartment, a detachable metallic disk secured to the cover and the circumference of which is inclosed by the annular sealing bead, a hand piece attached to the upper side of said cover, and a compressible tip secured to said hand piece and adapted to be engaged by the cover of the casing and whereby the sealing bead is tightly compressed to seal the pocket or compartment.

3. In a fireless cooker, a circular cover adapted to seal a compartment or pocket containing a heated vessel, said cover having a sealing bead on one side thereof adjacent to its circumference, said sealing bead consisting of a flexible strand which is inclosed by fabric casing united to the cover, an asbestos disk adjacent to the cover on one side and the circumference of which is inclosed by the sealing bead, and a detachable metallic disk adapted to shield the asbestos disk and the adjacent surface of the cover from the heat within the compartment or pocket, said metallic disk being detachable for the purposes of cleansing.

In testimony whereof I affix my signature, in presence of two witnesses.

PETER E. LITTLE.

Witnesses:
R. J. McCARTY,
MATTHEW SIEBLER.